US006431534B1

(12) United States Patent
Orosz et al.

(10) Patent No.: US 6,431,534 B1
(45) Date of Patent: Aug. 13, 2002

(54) CLAMPING TOOL FOR ALIGNING TUBES

(75) Inventors: Stephen William Orosz, Vermilion; Mario Michael Nolfi, Twinsburg; Thomas Joseph Nolfi, Chardon, all of OH (US)

(73) Assignee: Advanced Pneumatics, Mentor, OH (US)

( * ) Notice: Subject to any disclaimer, the term of this patent is extended or adjusted under 35 U.S.C. 154(b) by 0 days.

(21) Appl. No.: 09/641,275

(22) Filed: Aug. 17, 2000

(51) Int. Cl.[7] .................... B23Q 3/00

(52) U.S. Cl. .................... 269/43; 269/87.2; 269/249; 269/258; 269/268

(58) Field of Search .................... 269/258, 249, 269/268, 283, 284, 43, 87, 87.1, 87.2, 87.3

(56) References Cited

U.S. PATENT DOCUMENTS

| | | | | | |
|---|---|---|---|---|---|
| 575,685 | A | * | 1/1897 | Brockett | 269/249 |
| 1,344,700 | A | * | 6/1920 | Loomis | 269/258 |
| 2,440,820 | A | | 5/1948 | Frank | |
| 2,699,190 | A | * | 1/1955 | Packer | 269/258 |
| 3,403,901 | A | * | 10/1968 | Servadio | 269/249 |
| 3,596,898 | A | | 8/1971 | Hillburn | |
| 4,074,899 | A | * | 2/1978 | Hochstetler | 269/249 |
| 4,134,578 | A | * | 1/1979 | Stanely | 269/249 |
| 4,363,475 | A | | 12/1982 | McCarty | |
| 4,747,588 | A | | 5/1988 | Dillhoff | |
| 4,850,630 | A | * | 7/1989 | Davies | 269/258 |
| 4,962,918 | A | * | 10/1990 | Yang | 269/249 |
| 5,090,670 | A | | 2/1992 | Yang | |
| 5,135,209 | A | * | 8/1992 | Penny | 269/249 |

* cited by examiner

*Primary Examiner*—Robert C. Watson
(74) *Attorney, Agent, or Firm*—Hudak & Shunk Co., L.P.A.

(57) ABSTRACT

A clamping tool which can generally be utilized to align and hold tubes to be welded. The clamping tool has a curvilinear body or frame similar to a traditional "C"-shaped clamp which is well known in the art. The tool of the present invention has at least one solid angle clamping element or member which is formed from a single piece of metal. Advantageously, the solid angle clamping element is free of welds and can withstand numerous heating and cooling cycles typically associated with welding.

16 Claims, 11 Drawing Sheets

CLAMPING TOOL FOR ALIGNING TUBES

FIELD OF THE INVENTION

The present invention relates to a curvilinear clamping tool and more specifically to a substantially "C" shaped clamp which can be used to retain and hold the ends of two pipe sections together for welding.

BACKGROUND OF THE INVENTION

Throughout the ages, many tools, devices, and fixtures have been proposed and used for clamping and securement of workpieces. Examples of such devices include:

U.S. Pat. No. 5,135,209 to Penny relates to an apparatus arranged for selective mounting of plate-like coaxially aligned clamping plates, or alternatively the use of "V" shaped brackets mounted in a coaxially aligned relationship to clamp a pipe therebetween, wherein the brackets each include recesses formed at each side edge thereof, wherein the recesses are aligned relative to one another when secured together to provide access to a pipe joint positioned within the recesses for a machining procedure and the like.

U.S. Pat. No. 2,440,820 to Frank relates to clamps and has relation more particularly to a device of this kind of a "C" type, and it is an object of the invention to provide a clamp of this kind constructed in a manner to make the same particularly advantageous for use in holding the work against a seesaw type base.

U.S. Pat. No. 3,596,898 to Hillburn relates to a fixture for retaining the end of two pipe sections together during welding. The fixture comprises an upper clamp and a lower clamp, the lower clamp having an extension going out to one side and rigidly secured to an upstanding threaded rod. The upper clamp has an extension going out to one side and terminating in a sleeve, which is slidable up and down on the threaded rod but is not threaded to it. A wing nut or nut with a handle is threaded on the rod above the sleeve of the upper clamp and is used to tighten that clamp into place to hold the pipe ends firmly between the two clamp members. Central portions of the clamps are recessed to give greater availability to the welding fixture before the pipe has to be turned, so that only one turn is usually required to weld the entire peripheries of the two pipes.

U.S. Pat. No. 4,363,475 to McCarty relates to a vise-like C-clamp with adjusting screw and wherein two elongated square bars are fixedly attached to one jaw thereof and the clamping end of the adjusting screw whereby a pair of gripping heads may be selected from a group of variously shaped heads and oppositely and interchangeably arranged on each of the bars. The clamp may be hand held or adjustably mounted in a supporting base for gripping and positioning variously shaped work pieces in horizontal, vertical, and angularly held positions while work is performed thereon.

U.S. Pat. No. 4,747,588 to Dillhoff relates to a clamping tool for use in clamping and supporting a wide variety of elongated pieces for welding has a pair of generally C-shaped arms which support a pair of opposed L-shaped clamping members, one for each arm. Each clamping member has a long leg and a short leg, which extends perpendicular to the long leg, and each clamping member is supported on one of the arms for pivotal movement about two axes.

U.S. Pat. No. 5,090,670 to Yang relates to a C-clamp which may be clamped by a second C-clamp, so that large and irregular shaped workpieces may be clamped thereby, and further so that additional strength and stability is provided. The C-clamp includes an internal clamping face that contacts the workpiece during the clamping thereof. The C-clamp further includes a pair of external clamping faces that are contacted and clamped by the second C-clamp. The arm of the C-clamp that has the internal clamping face formed thereon has the external clamping faces substantially aligned therewith, so that vibrations produced by work being done on the workpiece are minimized. The clamp includes clamping heads that automatically pivot and swivel to accommodate the shape and angle of the surface and angle of the surface of the workpiece being clamped therewith.

It has been found that many prior art devices are deficient and cannot withstand the stresses placed on the same when subjected to high clamping torque common when tubes to be welded are misaligned, a common occurrence in boiler, refinery and other applications. Heating and cooling cycles common in welding can serve to weaken components generally utilized in the prior art, particularly the connection points between the clamping elements and feed screws. Thus, the prior art clamps are not suitable for welding operations and generally fail upon repeated use.

SUMMARY OF THE INVENTION

The present invention relates to an improved clamping tool for aligning and holding tubes, pipes, or solid round stock to be welded. The clamping tool has a curvilinear body or frame such as a traditional C-clamp which is well known in the art. The tool of the present invention has at least one solid angle clamping member which has been machine formed or cast from a single piece of metal and can be operably attached to an adjusting screw or clamping rod. The machined or cast solid or integral angle clamping member and adjusting screw are weldlessly connected to each other through the use of suitable attachment elements, such as spring pins. The weldlessly connected clamping member can withstand, without failure, high amounts of clamping torque and a plethora of heating and cooling cycles undergone while the tool is utilized to clamp or hold tubes to be welded together. The attachment elements also allow interchangeability of different sized clamping elements.

A further object of the present invention is to provide a clamping device, which is capable of clamping pipes or tubes of varying diameters. The clamping devices of the present invention can be used to clamp tubes having a diameter generally from about 0.25 to about 30 inches in diameter, desirably from about 0.50 to about 12 inches in diameter and preferably from about 1 to about 4 inches in diameter.

Yet another object of the present invention includes providing clamping elements of the present invention having recesses thereon to adapted to provide access to a pipe joint held or clamped within the recesses so that a large surface of the pipes can be welded without having to rotate the clamping device.

BRIEF DESCRIPTION OF THE DRAWINGS

For a fuller understanding of the present invention, the accompanying drawings incorporated in and forming a part of the specification, illustrate several aspects of the present invention, and together with the description, serve to explain the principles of the invention wherein.

DETAILED DESCRIPTION OF THE INVENTION

The drawings are referred to herein below for the purposes of illustrating the preferred embodiment of the invention only, and not for purposes of limiting the same. It is to be understood that the various aspects and parameters of the present invention can vary within the scope of the teachings herein.

Figure 1:
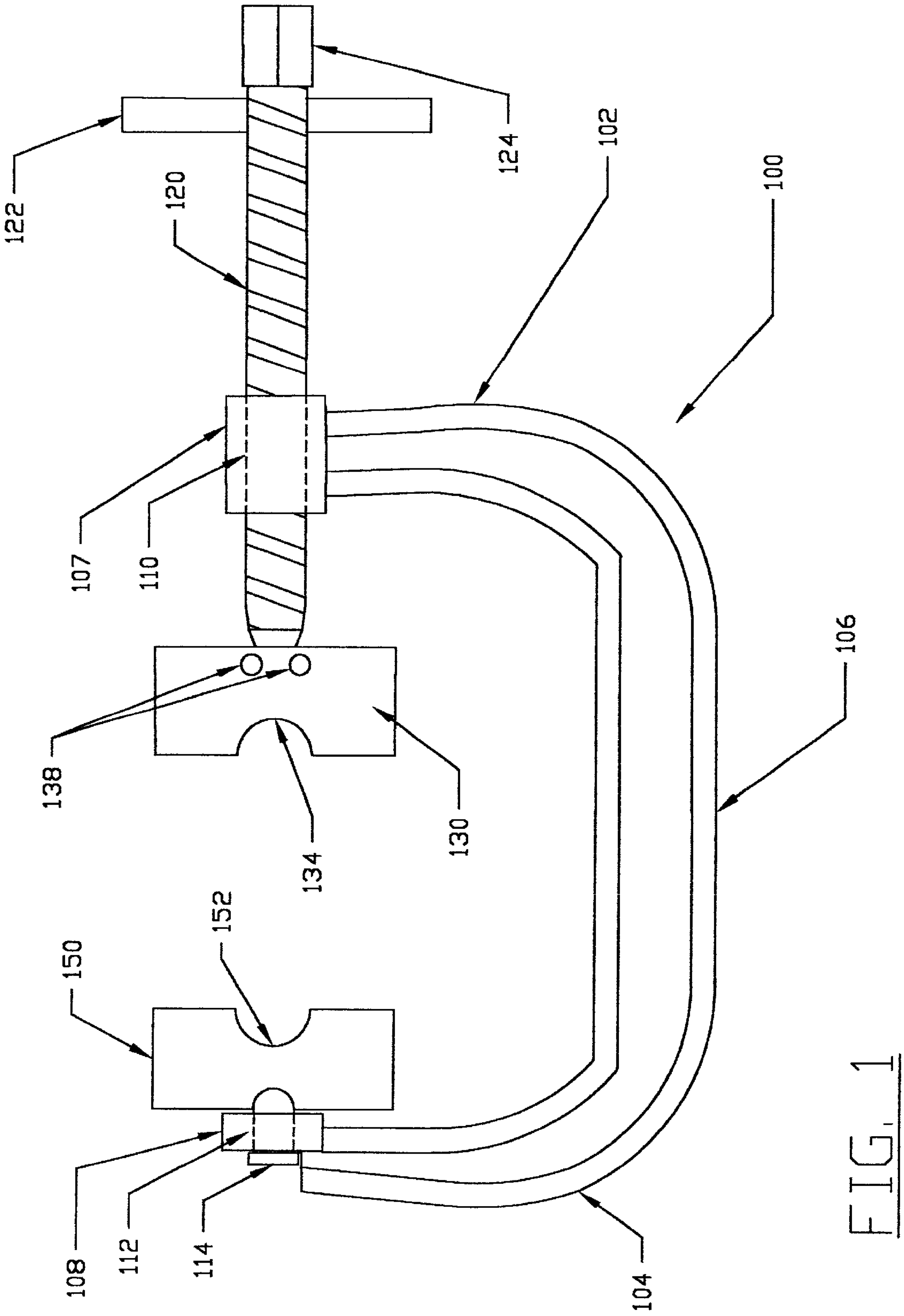
FIG. 1 is a side view of one embodiment of a clamping tool of the present invention.
Figure 2:
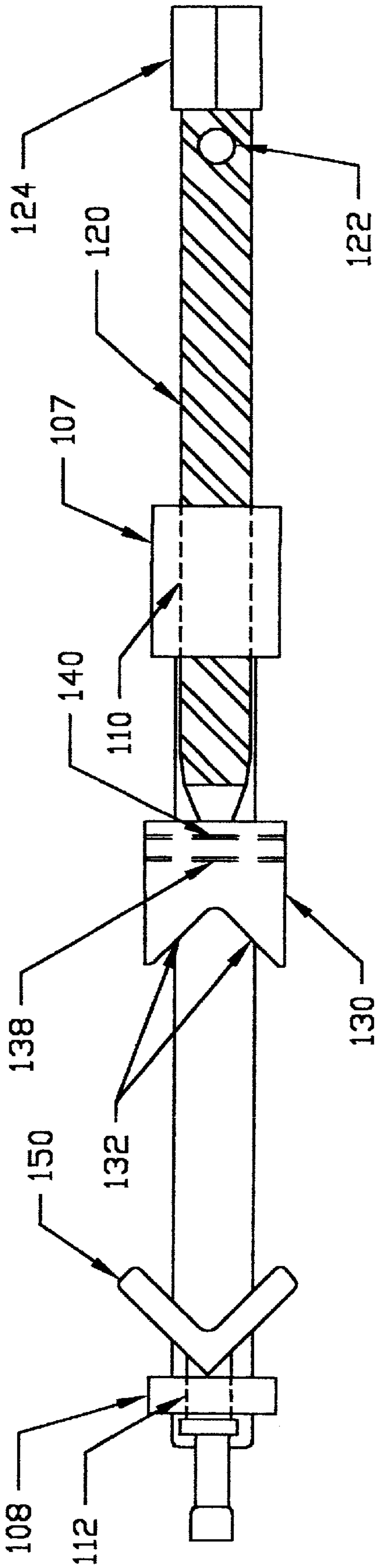
FIG. 2 is a front view of the clamping tool of FIG. 1.

FIGS. 1 and 2 illustrate one embodiment of the clamping tool or device 100 of the present invention. The clamping tool can generally have any curvilinear shape and desirably has a "C" shaped frame including a first arm 102 and a second opposite arm 104. The arms can be parallel to each other as shown, and can either be integral with one another, i.e. and not have an intermediate section, or they may be joined by an intermediate shank 106, which can be any desired length.

First arm 102 has first end member or clamp frame 107 thereon, located substantially at the distal end thereof. First end member 107 includes first bore 110 having an engaging element such as threading or a cam, and preferably the engaging element is threading.

Second arm 104 has a second end member or clamp frame 108 thereon, located substantially at the distal end of the second arm, with the second end member including a second bore 112 which can be smooth or optionally have an engaging element as defined above such as threading. First and second bores 110 and 112 are preferably parallel to intermediate shank 106 and aligned coaxially relative to each other.

A threaded adjusting screw or clamping rod 120 is threadedly received through first bore 110 and engages the threads thereof. The adjusting screw 120 can thus be moved or rotated towards or away from second end member 108 such as by utilizing handle member 122 to manipulate the screw in relation to the first end member 107 or arm 102. The handle member 122 is located at the distal end of adjusting screw 120 outside of clamp arm 102. The handle member can be slidably or fixedly positioned in the adjusting screw. A drive member such as hex head 124 can also be welded, machined or otherwise be affixed to the adjusting screw end to allow the use of a wrench or other tool to manipulate the adjusting screw.

Figure 3:
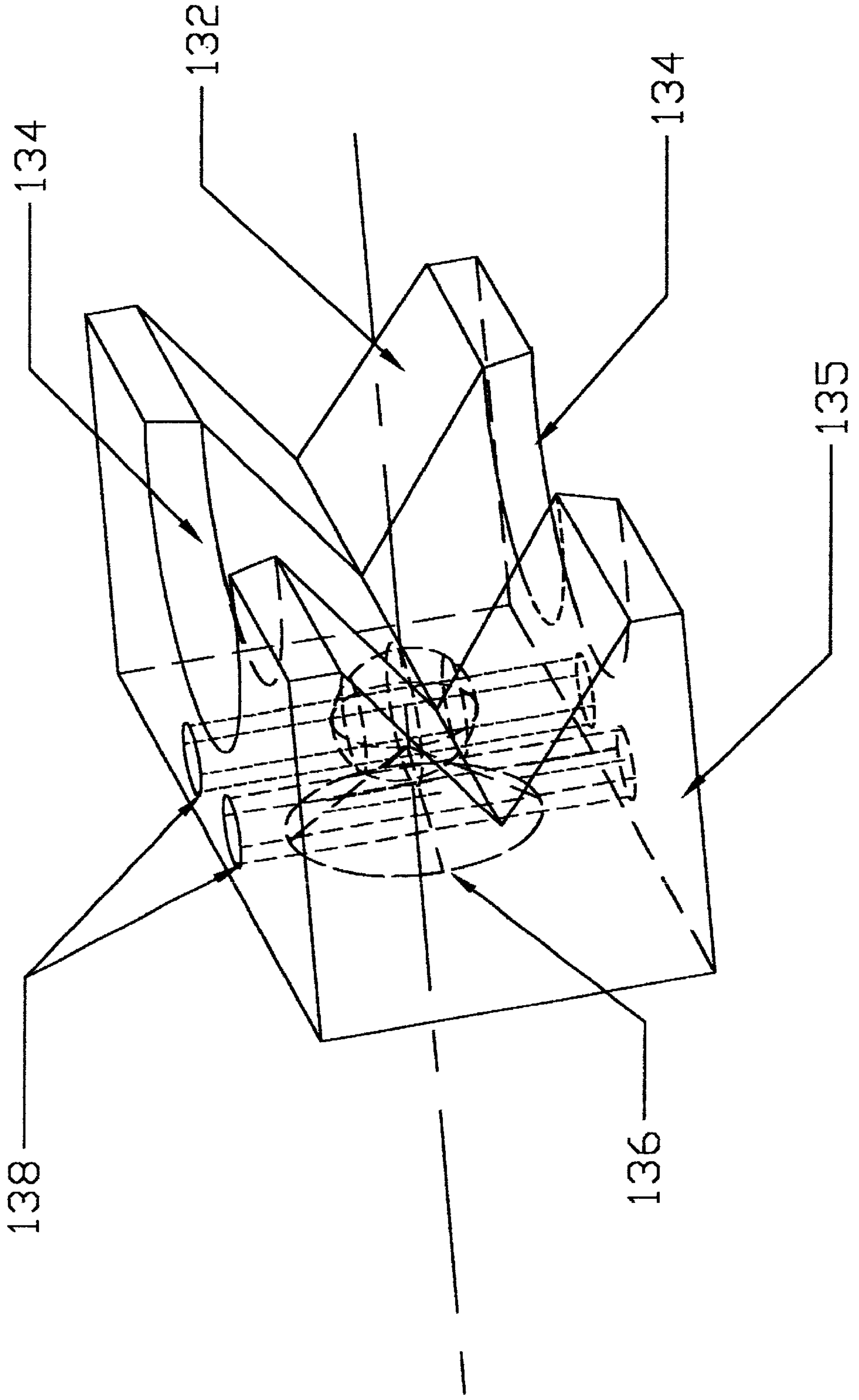
FIG. 3 is a perspective view of the preferred embodiment of the solid angle clamping member of the present invention showing a V-shaped recess for receiving tubes or pipes.
Figure 4A:
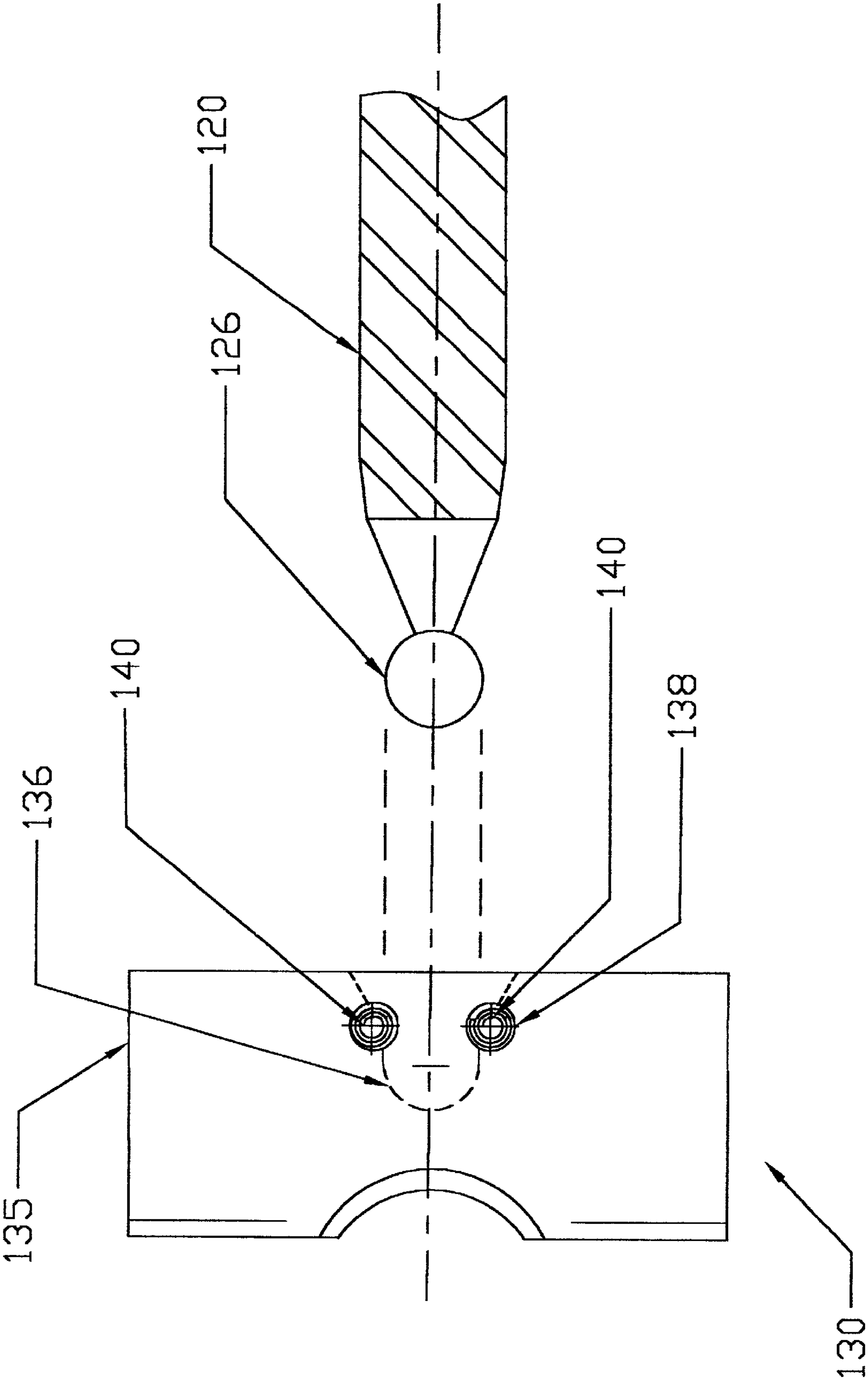
FIGS. 4(*a*) and 4(*b*) are assembly views of the clamping member, attachment elements, and adjusting screw.
Figure 4B:
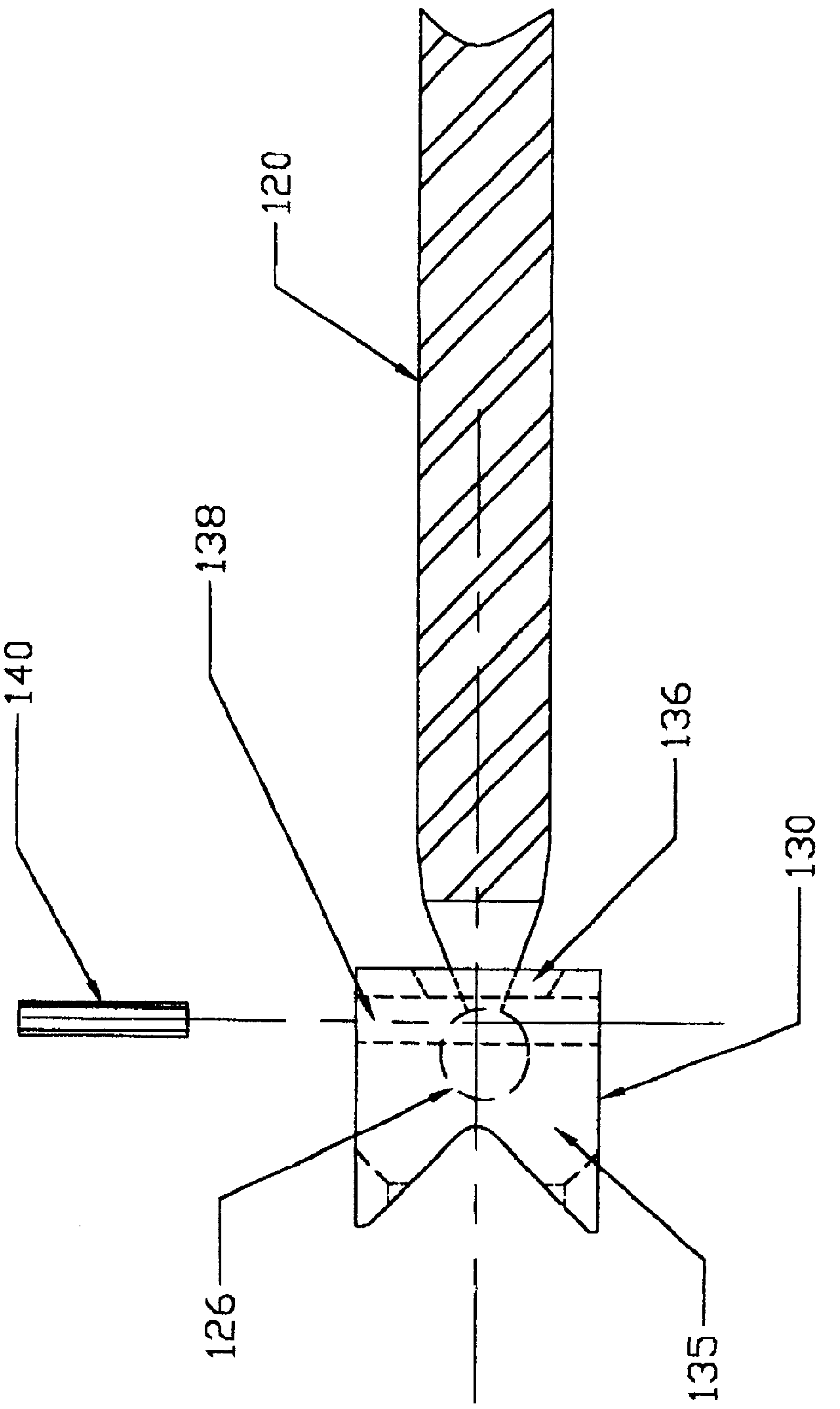

At least FIGS. 3, 4(*a*) and 4(*b*) illustrate the integral or solid angle clamping member 130 of the present invention. An important feature of the present invention is that the solid angle clamping member is constructed, preferably machined or cast from a single piece of suitable metal. Another unique feature of the solid angle clamping member is that the flat surfaces thereon, particularly end portion 135 or the longitudinal width can be used as a striking anvil or hammer to assist in alignment of the tubes or other elements before using the tool as a clamp. The flat or substantially flat face of end portion 135 ensures a large contact area and thus minimizes denting, imprinting or gashing which would be left by a clamping member that does not have a solid substantially flat end surface such as "V" shaped clamping member 150.

Single piece clamping member 130 maximizes strength and rigidity and does not contain any joining points or areas which are present when more than one piece or member is utilized to form a clamping member which can weaken during numerous heating and cooling cycles when the tool is used as a welding aid. That is, the solid angle clamping member is free of welds, adhesives, snap rings and swaging. Solid clamping member 130 includes a grasping face such as a cavity and desirably has a substantially "V" shaped face 132 which is capable and adapted to hold or otherwise receive tubes or pipes, especially those to be welded. The "V" shaped face generally extends along the length of clamping member 130 that is, along the longitudinal length of a pipe to be secured therein. Generally transverse thereto is recessed area 134 which is generally centrally located on face 132 to provide a greater access to first and second pipe ends such as for welding or other mechanical operation to be performed. An attachment cavity 136 is located on the base of solid clamping member 130 opposite face 132, and is adapted to accept or otherwise accommodate swivel head 126 which is located at the clamping end of adjusting screw 120.

As can be seen in at least FIGS. 4(*a*) and 4(*b*), securing holes 138 extend transversely and completely through solid clamping member 130, at the base thereof, and allow attachment elements 140 to operably secure solid angle clamping member 130 to adjusting screw 120 through swivel head 126. Attachment elements include but are not limited to nuts and bolts, cotter pins, dowel pins, cleavis pins, needle bearings and spring pins with spring pins being preferred. Due to the attachment element connection described above, solid angle clamping member 130 can rotate or swivel on swivel head 126 in both a longitudinal and a transverse direction to allow for precise alignment or angular orientation of clamping member and pipes to be welded. Thus, the solid angle clamping member can rotate 360 degrees about an axis perpendicular to the adjusting screw, i.e. in a plane. The swivel head and attachment elements further allow the solid angle clamping member angular movement in a range generally from about minus 30 to about plus 30 degrees and preferably in a range from about minus 20 to about plus 20 degrees in relation to an axis perpendicular to the axis of the adjusting screw, eg. in a transverse and/or longitudinal direction.

In one embodiment of the present invention, second end member 108 contains second bore 112, which is smooth and not threaded. Bore attachment 114 can be a shaft, pin, plug, or any suitable fastening device which can extend through bore 112 and be attached to "V" shaped clamping member 150 at a desired fixed distance from end member 108. The shape of clamping member 150 can be very similar to clamping member 130 in that it has a cavity as defined by the longitudinal "V" shaped recess and transverse recess 152. Thus, through the fixed distance connection, "V" shaped clamping member 150 can swivel or rotate 360 degrees to allow for precise alignment or angular orientation with respect to solid angle clamping member 130 or element or elements to be held therebetween. "V" shaped clamping member can have at least one recess 152 to allow welding access as stated above.

Figure 5A:
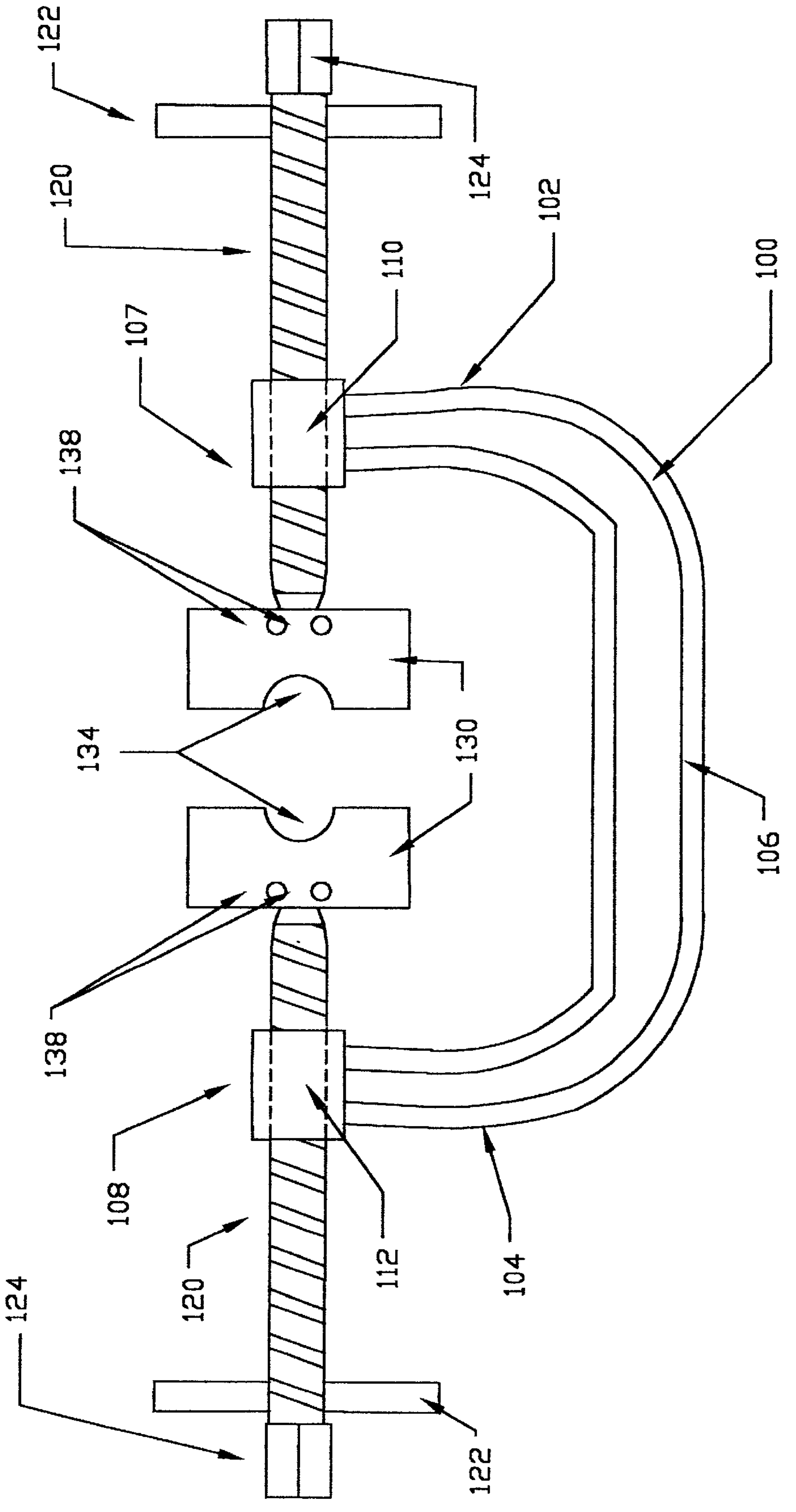
FIGS. 5(*a*) and 5(*b*) are a side view and a front view, respectively, of a further embodiment of the clamping tool of the present invention.
Figure 5B:
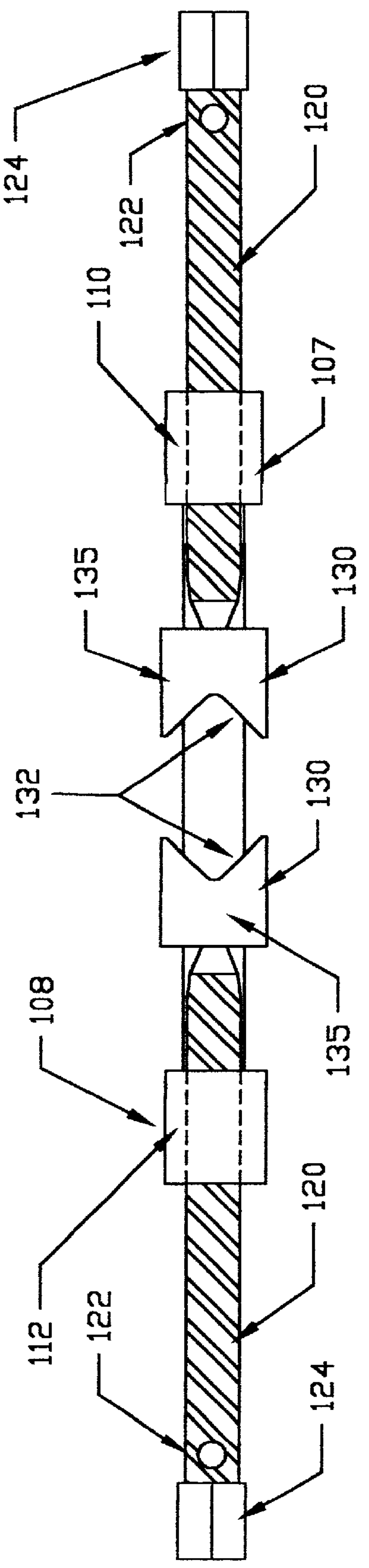
Figure 6A:
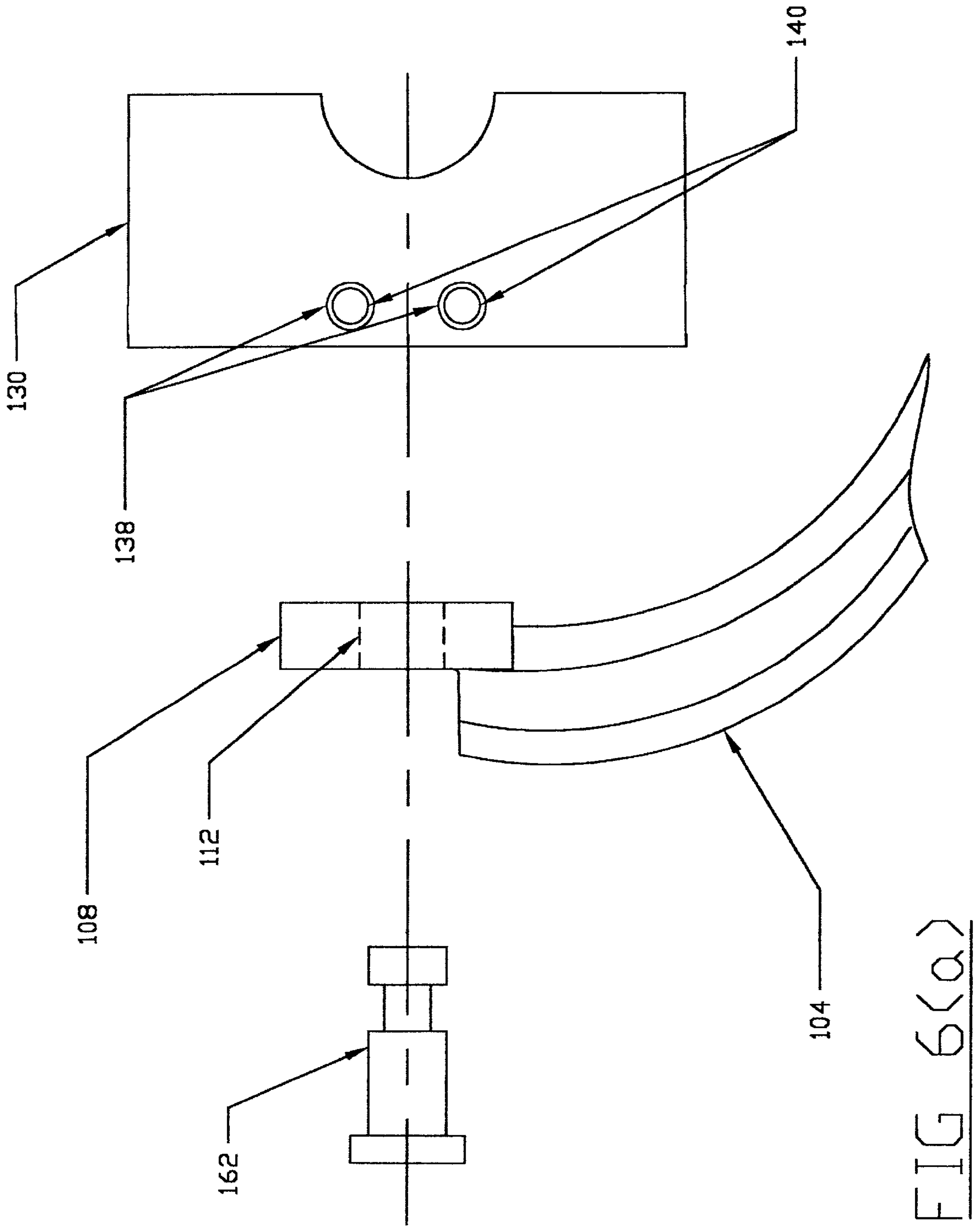
FIGS. 6(*a*) through 6(*d*) show alternative bore attachments of the present invention.
Figure 6B:
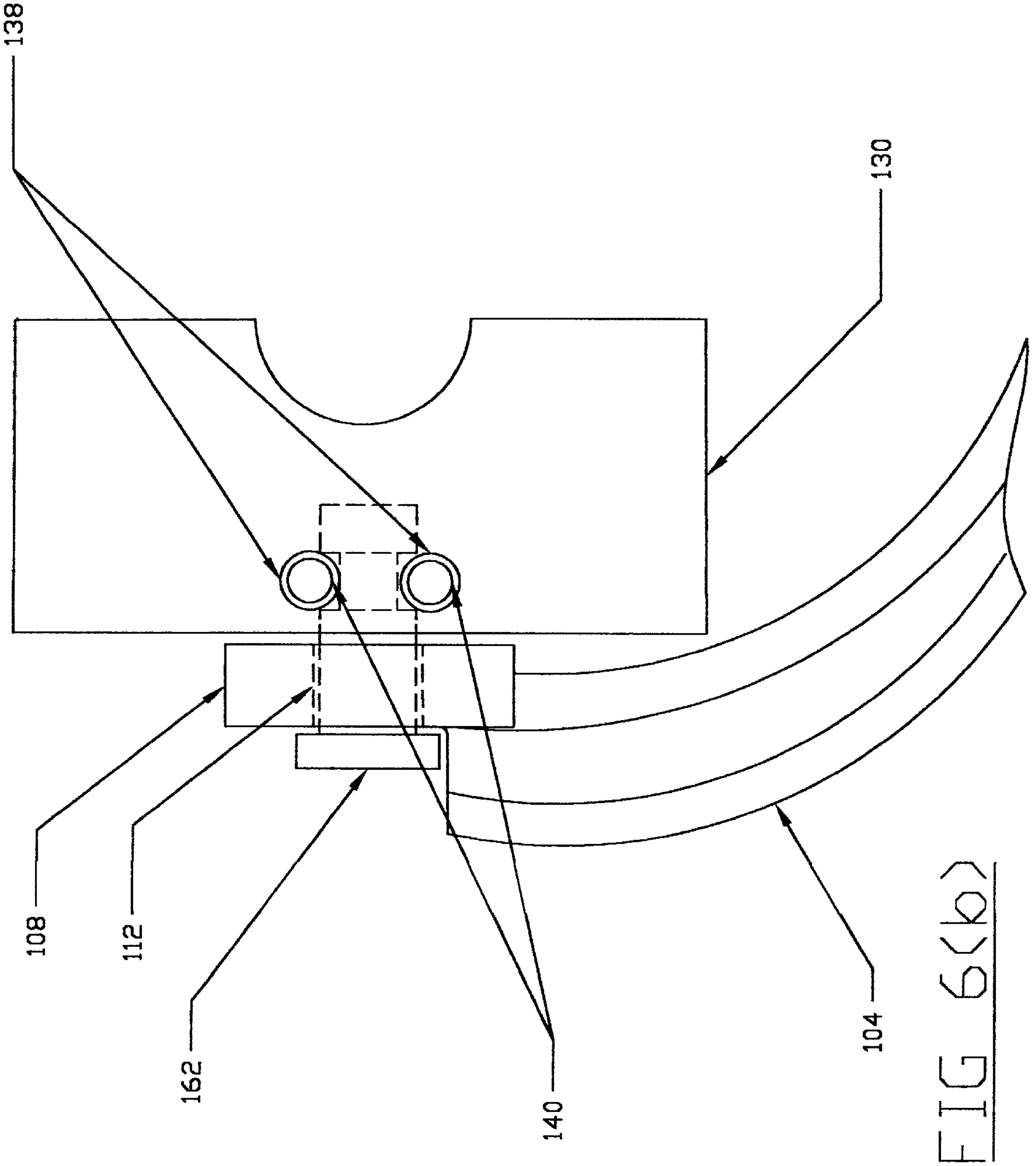
Figure 6C:
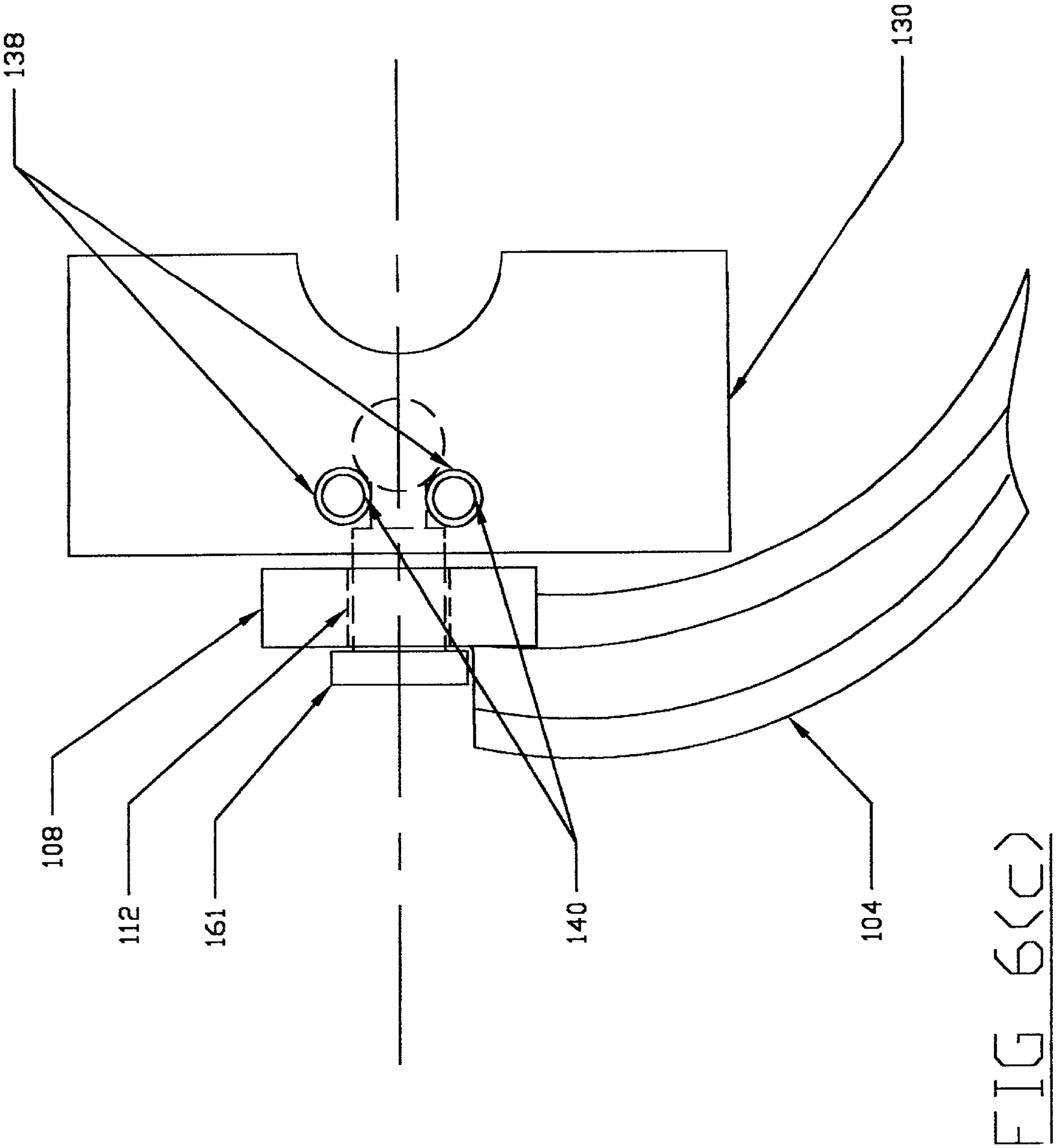
Figure 6D:
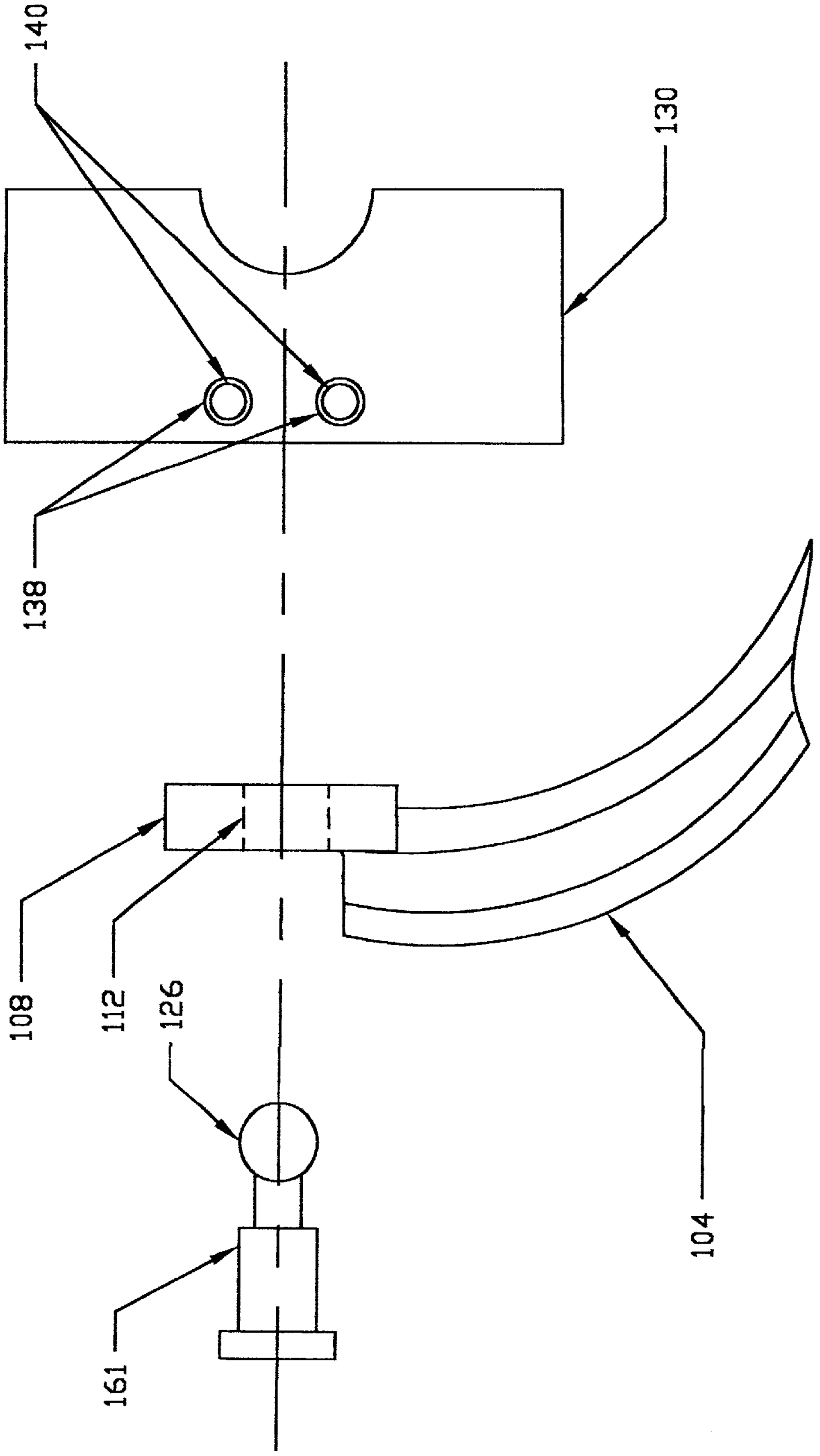

In a second embodiment as in FIGS. 5(*a*) and 5(*b*), second bore 112 is threaded to accept an adjusting screw 120, as described above, to which a solid angle clamping member 130 is attached in the same manner as described above. Thus, this embodiment has two solid angle clamping members weldlessly attached each to separate adjusting screws.

In yet a third embodiment as in FIGS. 6(*a*) through 6(*d*), second end member contains a bore 112 which is substantially smooth. A swivel head bore attachment 160 is placed through bore 112 as shown in FIGS. 6(*c*) and 6(*d*). A solid angle clamping member 130 is then rotatably attached to the swivel head portion 126 of the bore attachment 150, as shown in FIG. 6(*d*), utilizing attachment elements 140 in the manner described above. Alternatively, as shown in FIGS. 6(*a*) and 6(*b*), a bore head attachment 152 having a head which does not allow angular movement other than in the axis perpendicular to the adjusting screw can be used in place of swivel attachment 150.

The clamping device of the present invention can at least be used in the following manner. Generally, the tubes to be welded together are arranged in relative alignment to each other. Often, it is necessary such as when welding boiler tubes together to utilize the end 135 of solid angle clamping member as a hammer or anvil to assist in tube alignment. Then, the clamp is placed over the tubes so that the areas to be welded are located substantially around the recessed area of the clamping members. The clamp is then tightened utilizing the handle member thereon. Alternatively, drive or hex member 124 can be utilized to further secure the tubes. The operator then uses the openings between the clamping members and/or recessed areas thereon to tack weld the tubes together. The clamp can then be removed and the weld completed.

As stated above, the clamping tool of the present invention having the weldless, clipless and swageless connected solid angle clamping member and adjusting screw, can withstand high clamp force heating and cooling cycles typically associated when the tool is utilized as a welding aid. Furthermore, the attachment elements of the present invention allow for easier disassembly than previous swaged designs thus allowing for higher quality inspection and easier maintenance. Still further, the attachment elements allow interchangeability with different size solid angle clamping member heads. The solid angle clamping member can also be used as a hammer or striking anvil to align tubes before being clamped by the tool of the present invention.

The illustrations presented herewith show typical arrangements for supporting a wide variety of structural parts and members for welding and the like, but it should be understood that these are presented for illustrative purposes only, and that the user will find further examples of advantageous ways of using the clamping tool. Since each of the clamping members may be either pivoted or rotated about an axis and the clamping member is provided with at least one adjustable adjusting screw, the combination provides for a wide variety of configurations.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A clamping device for securing at least one element; comprising:

a curvilinear shaped frame including two arms, said arms each having a bore, at least one of said bores having an engaging element;

at least one adjusting screw engagably received in one of said bores, said adjusting screw having a swivel head; and at least one solid angle clamping member, wherein said solid angle clamping member is formed from a single piece of metal, wherein said solid angle clamping member has a cavity in the base thereof, wherein said adjusting screw swivel head is receivably attached in said cavity, said solid angle clamping member operably attached to said swivel head of said adjusting screw in said cavity so that said solid angle clamping member can angularly move in a range generally from about minus thirty to about plus thirty degrees in relation to an axis perpendicular to the axis formed by the adjusting screw, said solid angle clamping member being substantially free of any welding, said solid angle clamping member having a clamping face comprising a first recess and a second recess transverse to said first recess adapted to provide access to an object held in said first recess to allow for a mechanical operation to be performed, said solid angle clamping member including a striking face at each end of said first recess, and said striking face being a substantially flat planar surface.

2. A clamping device according to claim 1, wherein said solid angle clamping member is also free of swaging, adhesive or snap rings.

3. A clamping device according to claim 2, wherein said solid angle clamping member striking face is adapted to be used to align tubes.

4. A clamping device according to claim 1, wherein said solid angle clamping member is operably attached to said adjusting screw with attaching elements.

5. A clamping device according to claim 4, wherein said clamping device includes a "V" shaped clamping member operably attached to the other of said arms.

6. A clamping device according to claim 4, wherein said clamping device includes two adjusting screws and two solid angle clamping members, each said clamping member operably attached to one of said adjusting screws.

7. A clamping device according to claim 4, wherein said clamping device includes a second solid angle clamping member operably attached to one of said arms at a fixed distance.

8. A clamping device according to claim 4, wherein said engaging element is threading, and said attaching elements are spring pins.

9. An improved clamping tool comprising;

a curvilinear shaped frame including a first arm having a first bore and a second arm having a second bore, said first bore and said second bore being substantially aligned, said first bore having an engaging element, said second bore having an engaging element;

at least one adjusting screw engagably received in said first bore, said adjusting screw having a swivel head; and at least one solid angle clamping member, wherein said solid angle clamping member is formed from a single piece of metal, wherein said solid angle clamping member has a cavity in the base thereof, and wherein said adjusting screw swivel head is receivably attached in said cavity, said angle clamping member attached to said swivel head of said adjusting screw in said cavity so that said solid angle clamping member can angularly move in a range generally from about minus thirty to about plus thirty degrees in relation to an axis perpendicular to the axis formed by the adjusting screw, said solid angle clamping member being substantially free of any welding, said solid angle clamping member having a clamping face comprising a first recess and a second recess traverse to said first recess adapted to provide access to an object held in said first recess to allow for a mechanical operation to be performed, said solid angle clamping member including a striking face at each end of said first recess, and said striking face being a substantially flat planar surface.

10. A clamping device according to claim 9, wherein said solid angle clamping member is also free of swaging, adhesive or snap rings.

11. A clamping device according to claim 9, wherein said solid angle clamping member striking face is adapted to be used to align tubes.

12. A clamping device according to claim 9, wherein said solid angle clamping member is operably attached to said adjusting screw with attaching elements.

13. A clamping device according to claim 12, wherein said clamping device includes a "V" shaped clamping member operably attached to said second arm.

14. A clamping device according to claim 12, wherein said clamping device includes two solid angle clamping members, said solid angle clamping member each operably attached to a said separate said arm with said adjusting screws.

15. A clamping device according to claim 12, wherein said clamping device further including a second solid angle clamping member operably attached to said arm at a fixed distance.

16. A clamping device according to claim 12, wherein said engaging element is threading, and said attaching elements are spring pins.

* * * * *